Patented Jan. 31, 1950

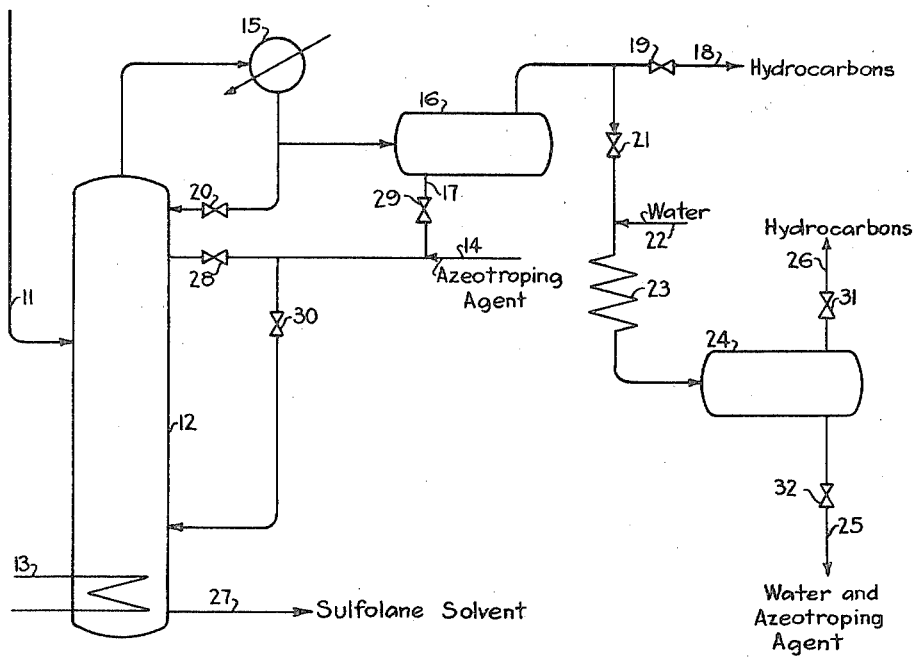

2,496,207

UNITED STATES PATENT OFFICE 2,496,207

AZEOTROPIC DISTILLATION OF HYDROCARBONS FROM SULFOLANES

Arthur E. Handlos, Berkeley, and Gino J. Pierotti, Albany, Calif., assignors to Shell Development Company, San Francisco, Calif., a corporation of Delaware Application February 25, 1947, Serial No. 730,822

10 Claims. (Cl. 202—42)

This invention relates to the recovery of selective solvents of the class of sulfolanes from mixtures or solutions thereof with hydrocarbons, and, more particularly, with hydrocarbons having boiling temperatures which are the same as or near to the boiling point of the selective solvent.

Sulfolanes have recently come into use as selective solvents for the separation of hydrocarbon mixtures; their chemical structure and use are described in U. S. Patents Nos. 2,360,859 and 2,360,861. The simple sulfolane is also known as dihydrobutadienesulfone. Such solvents may be used in liquid-liquid solvent extraction processes, wherein a liquid mixture of hydrocarbons is brought into contact with the solvent which is likewise in the liquid state, resulting in the formation of extract and raffinate phases. They may also be used in distillation processes, either as separating or azeotroping agents in azeotropic distillation, or as solvents in extractive distillation. In any of these applications the sulfolane solvent occurs in at least one of the resulting hydrocarbon fractions.

The quantitative recovery of the solvent from the hydrocarbons is dictated by the cost of the solvent and/or by the required purity of the separated hydrocarbon fraction which may consist of a single compound or a mixture of hydrocarbons. To accomplish this recovery by ordinary distillation is often very difficult or impossible because the boiling points of the solvent and of the associated hydrocarbons are sometimes the same or so close together that precise fractional distillation would be needed to effect a complete recovery. Moreover, when the hydrocarbon fraction associated with the solvent consists of a mixture of hydrocarbons, the boiling range of such fraction may extend above and below the boiling point of the solvent.

In certain instances the solvent may be effectively recovered from the hydrocarbons by washing the solution of hydrocarbon and solvent with water or with some organic or inorganic washing agent which is miscible with the solvent but not with the hydrocarbons. This expedient is not always feasible because certain sulfolanes are not sufficiently water-miscible to permit washing out in a reasonable number of washing stages. For example, dimethyl sulfolane is particularly suitable for the extraction of kerosene, but has an insufficient solubility in water to permit the quantitative recovery of the solvent by water wash unless so many successive stages and so great a quantity of water is used as to become uneconomical. The use of other washing agents entail similar difficulties and, further, tend to dissolve some of the hydrocarbons. This difficulty is particularly present when it is desired to recover the solvent from the hydrocarbon fraction rich in naphthenes or aromatics, i. e., the extract phase in solvent extraction processes and the bottom product is azeotropic and extractive distillations.

It is an object of this invention to provide an improved process for the quantitative removal of a selective solvent of the sulfolane class from a solution thereof with hydrocarbons which will result in a substantially solvent-free hydrocarbon, and which will be economical to operate.

In accordance with this invention the mixture or solution of a sulfolane solvent and hydrocarbons, obtained from any source, such as the extraction or distillation processes previously mentioned, is distilled in a fractional distillation zone in the presence of an auxiliary azeotroping agent, which forms a binary low-boiling mixture with the hydrocarbons, said binary mixture having a lower boiling point than the boiling point of the sulfolane solvent. When the hydrocarbons cover a wide boiling range, low boiling mixtures of the highest-boiling hydrocarbon constituents and the azeotroping agent must boil below the boiling temperature of the solvent.

The "low boiling mixture" referred to is believed to be an azeotrope. It is, however, immaterial whether it be a true azeotrope, a pseudo-azeotrope, or whether the composition of the vapors be constant, the only requirement being that the mixture has a greater volatility than the sulfolane solvent and is recovered in the top product. To determine which substances form low-boiling mixtures with hydrocarbons is well known in the art, and involves the distillation of a small sample of a mixture of hydrocarbons and the substance in question.

To permit the use of relatively few plates in the distillation column it is desirable that the low boiling mixture or mixtures boil as far below the boiling point of the solvent as possible. For this reason a volatile azeotroping agent, i. e. one having a low boiling point is employed. On the other hand, for any given hydrocarbon, the ratio of hydrocarbons to azeotroping agent in the distillate decreases as azeotroping agents of lower boiling points are employed. In balancing these opposing considerations, it was found desirable to employ azeotroping agents which have boiling points below that of the sulfolane solvent and, preferably, falling within the lower half of the boiling range of the hydrocarbon fraction. For example, when the fraction has a boiling range from 200° to 300° C., and dimethyl sulfolane is the solvent, an azeotroping agent boiling between 200° and 250° C. is preferably employed. It is evident, however, that higher- and lower-boiling agents may also be used.

A further requirement is that the azeotroping agent be readily separable from the hydrocarbons by chilling or by washing with water or some other washing agent which is substantially immiscible with the hydrocarbons.

It has been found that polar organic compounds which meet the requirements as to volatility are suitable for use in the present process. Thus, when dimethyl sulfolane, having a boiling point of 281° C., is the solvent, the following azeotroping agents are suitable:

Benzyl alcohol
Ethylene glycol

The process according to this invention may be applied to solutions of hydrocarbons with any sulfolane solvent. The simple sulfolane has the formula

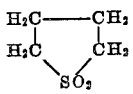

Its derivatives are compounds wherein one or more of the hydrogen atoms are replaced by an organic radical which may contain a polar grouping and, more specifically, may contain oxygen, nitrogen, sulfur and/or halide atoms. In hydrocarbon-substituted sulfolanes the hydrocarbon radicals are most commonly alkyl radicals. The process is applicable to any of the sulfolane derivatives of this type, such as derivatives being more completely enumerated in the U. S. Patent No. 2,360,859, the disclosure of which patent is incorporated herein by reference.

The process is particularly applicable to sulfolane itself and to hydrocarbon-substituted sulfolanes wherein one or more of the hydrogen atoms is replaced by alkyl radical having from one to ten carbon atoms, inclusive, i. e., to sulfolane solvents containing more than three and less than fifteen carbon atoms, inclusive, such as 3-methyl sulfolane, 2,4-dimethyl sulfolane, and 2-isopropyl sulfolane. Other examples of such sulfolane solvents are enumerated in U. S. Patent No. 2,360,861, the disclosure of which patent is incorporated herein by reference.

Azeotroping agents, in general, are substances which satisfy the volatility requirements set forth above, are at least partially immiscible with the hydrocarbons so as to form two liquid phases when mixed with the hydrocarbons, and are readily miscible with the sufolane solvent, although complete miscibility at all temperatures and ratios is not essential. The preferred group of azeotroping agents comprises those that, moreover, are preferential solvents for the sulfolane solvent. By "preferential solvents for the sulfolane solvent" is meant an azeotroping agent in which the sulfolane solvent will dissolve in a greater concentration than in the hydrocarbon phase when a mixture of the azeotroping agent and the hydrocarbons is permitted to form two liquid phases in the presence of the sulfolane solvent.

Other examples of azeotroping agents which are suitable for the practice of the invention are various alcohols and polyhydric alcohols and various esters and ethers thereof such as propylene glycol, isobutylene glycol, butanediol-1,2, 2-cyclohexanol carbinol, diethylene glycol mono-methyl ether, diethylene glycol, trimethylene glycol, 2-octanol, n-octanol, n-nonylalcohol, n-decyl alcohol and furfuryl alcohol.

The invention will be better understood from the following detailed description, taken together with the drawing, the single figure of which is a schematic flow diagram showing a preferred embodiment thereof.

In the drawing, a solution of a sulfolane solvent and hydrocarbons is introduced at 11 into a fractional distilling column 12 sharing a reboiler 13. This solution may, for example, be the extract phase obtained from the solvent extraction of kerosene having a boiling range of 170° to 260° C. with dimethyl sulfolane and consists of 90% sulfolane and 10% hydrocarbons, 75% of the hydrocarbons being aromatic. Ethylene glycol, used as the azeotroping agent, is introduced into the system at 14 and forms low boiling mixtures with the hydrocarbons, which mixtures boil below the boiling point of the dimethyl sulfolane.

The ethylene glycol not used in the forming of low boiling mixtures in the upper part of the column is carried downward in the column with the reflux, so that it occurs throughout the column. Vapors, entirely or substantially free from dimethyl sulfolane, are withdrawn at the top of the column, cooled in condensers 15, and introduced into a settler or phase separator 16. Ethylene glycol is only very slightly miscible with hydrocarbons of kerosene boiling range, and forms a separate liquid phase which is withdrawn at the bottom of settler 16. All or a part of the withdrawn ethylene glycol layer is reintroduced into the column 12 through the lines 17 and 14 via valves 28 and 29. This phase may contain small quantities of hydrocarbons. While the glycol phase is usually returned in the form in which it is separated from the hydrocarbon phase, it may be subjected to other treatments to recover the pure ethylene glycol, only the latter being re-introduced into the process through line 14. The hydrocarbon phase is withdrawn at 18 through valve 19. Additional reflux for efficient operation of the column may be provided by flowing a part of the condensate through the valve 20.

The hydrocarbon phase withdrawn at 18 may be separated from the process as product. It will be substantially free from ethylene glycol. The amount of ethylene glycol occurring in this phase will, however, depend upon the temperature in the separator 16. When it is too high, it may be desirable to close valve 19 to feed the hydrocarbon phase via valve 21 into a final washing stage wherein it is washed with water. Thus, water may be introduced at 22 and mixed with the hydrocarbons in mixer 23, and the resulting mixture introduced into a separator 24, there stratification occurs. The water layer, containing small amounts of ethylene glycol is drawn off at the bottom at 25 via valve 32 and may be wasted or distilled for recovery of the glycol. Washed hydrocarbons are withdrawn at 26 via valve 31.

Dimethyl sulfolane is withdrawn from the bottom of the column 12 at 27 and returned to the extraction process for extraction of further quantities of hydrocarbons. The quantity of ethylene glycol in the column is preferably regulated by means of valves 20, 28, 29 and 30 so that the overall ratio of ethylene glycol to hydrocarbons introduced into the column is equal to the ratio of ethylene glycol to hydrocarbons in the vapors drawn off at the top of the column.

In this manner the bottom product will be free from ethylene glycol. To insure exclusion of dimethyl sulfolane from the top product and of ethylene glycol from the bottom product, it is possible to operate with a slight deficiency of ethylene glycol in the column. In this way all of the ethylene glycol is used to form low-boiling mixtures and a minor portion of the hydrocarbons are withdrawn as bottom product. In this case at least a part of the ethylene glycol may be fed into the column at a point near to or below the feed level 11, as through valve 30. The presence of minor amounts of hydrocarbons in the bottom product is not objectionable because this product is used as a solvent for the treatment of further quantities of similar hydrocarbons.

However, in many cases the complete exclusion of ethylene glycol from the bottom product is not desired, because a small quantity of ethylene glycol in the sulfolane is useful in certain types of treatments. For example, the melting point of sulfolane is 26° C., but a solution containing 1% ethylene glycol has a melting point of between 10 and 13° C., facilitating handling without freezing. Moreover, ethylene glycol promotes the selectivity of sulfolane in solvent extraction processes. In such cases it is preferable to operate the column 2 with an excess of the azeotroping agent.

It was further found that the most suitable azeotroping agents are those which have a preferential solvent action on the sulfolane solvent. For example, when ethylene glycol is used, most of the sulfolane solvent occurring in the vapor from the column 12 will enter the lower layer in the separator 16. The exact distribution ratio depends upon the temperature and the composition of the hydrocarbons, but at room temperature the concentration of sulfolane solvent in the azeotroping agent phase in separator 16 is of the order of eight times as great as its concentration in the hydrocarbon phase. If the ratio of azeotroping agent to hydrocarbons is two to one, it is evident that only about one sixteenth of the sulfolane solvent entering the separator 16 remains in the hydrocarbons. Accordingly, when the preferred azeotroping agents are employed it is not essential to operate the column to exclude all of the sulfolane solvent from the vapor.

To illustrate this invention more fully the following example with the aid of the diagram is a full description of an actual run, the data as set forth being self-explanatory as to the benefits derived in recovering solvents and hydrocarbons by the method of this invention.

Approximately 91 volumes of a solution of hydrocarbons and sulfolane solvent were introduced per unit time into column 12 through line 11 at a temperature of about 140° C. The hydrocarbon contained about 3.1% by weight of a hydrocarbon extract, said extract containing about 83.7% of aromatics. The kettle or reboiler temperature at 13 was maintained at about 195° C. and at a pressure of about 21 inches mercury. The top plate in column 12 was maintained at about 95° C. and at a pressure of approximately 24 inches mercury. Ethylene glycol was introduced into the system at 14 to form low boiling mixtures with the hydrocarbons which mixtures boil below the boiling temperature of the sulfolane.

The overhead vapors substantially free from sulfolane were withdrawn at the top of column 12, and conducted to condenser 15 where the vapors were condensed and thereafter the liquid was directed to settler or phase separator 16. Ethylene glycol forming one phase of the mixture was withdrawn from the phase separator through line 17 and reintroduced into column 12 via valves 28 and 29 together with make-up ethylene glycol which was introduced into column 12 through line 14 via valve 28. Approximately 4.0 volumes of hydrocarbon (per same unit of time as above) were removed from the phase separator 16 and withdrawn therefrom in line 18 through valve 19.

The recovered hydrocarbon was substantially free from ethylene glycol so that it was unnecessary to subject it to any further wash treatment.

The sulfolane removed from the bottom of column 12 through line 27 was recovered at a rate of approximately 87 of the above volumes per above unit time and contained less than 2% by weight of ethylene glycol. The glycol can be recovered and the sulfolane returned to the extraction process for extraction of further quantities of hydrocarbons.

By the process of this invention complete recovery of pure hydrocarbons is possible and further treatment such as washing unnecessary.

The broad concept of this invention as well as the specific embodiment of it has been clearly presented above. The specific example however is not to be construed as a limitation of this invention, for many modifications can be made without departing from the spirit of this invention and only such limitations should be imposed as are included in the appended claims.

We claim as our invention:

1. A process for removing a sulfolane solvent from a mixture thereof with a hydrocarbon fraction having a boiling point range embracing the boiling temperature of the sulfolane solvent and comprising a major proportion of aromatic hydrocarbons, comprising the steps of distilling said mixture in a distillation zone in the presence of an azeotroping agent which is capable of forming two liquid phases with the hydrocarbon fraction and forms low-boiling mixtures with the constituents of said hydrocarbon fraction, the low-boiling mixtures having boiling points below the boiling temperature of the sulfolane solvent, said azeotroping agent being an aliphatic alcohol having a boiling point below that of the sulfolane solvent and within the lower half of the boiling range of the hydrocarbons separating the resulting overhead distillate consisting predominantly of hydrocarbons and azeotroping agent from the distillation residue consisting predominantly of sulfolane solvent, condensing the distillate, and separating the condensed distillate into a liquid hydrocarbon phase and a liquid azeotroping agent phase.

2. The process according to claim 1 in which at least a portion of the liquid azeotroping agent phase is returned to the distillation zone.

3. A process for removing a sulfolane solvent containing more than three and less than fifteen carbon atoms from a mixture of said solvent with hydrocarbons comprising a major proportion of aromatic hydrocarbons, comprising the steps of distilling said mixture in a distillation zone in the presence of an azeotroping agent which is capable of forming two liquid phases with the hydrocarbons and forms low-boiling mixtures with the hydrocarbons, the low-boiling mixtures having boiling points below the boiling temperature of the sulfolane solvent, said azeotroping agent being an aliphatic alcohol having a boiling point below that of the sulfolane solvent and within the lower half of the boiling range of the hydrocarbons separating the resulting overhead distillate consisting predominantly of hydrocarbons and azeotroping agent from the distillation residue consisting predominantly of sulfolane solvent, condensing the distillate, and separating the condensed distillate into a liquid hydrocarbon phase and a liquid azeotroping agent phase.

4. The process according to claim 3 in which the distillation is effected in the presence of a small excess of the azeotroping agent over the amount required to form low-boiling mixtures with the hydrocarbons, whereby the distillation residue contains some of the azeotroping agent.

5. The process according to claim 3 in which the azeotroping agent is ethylene glycol.

6. The process according to claim 3 in which the sulfolane solvent is dimethyl sulfolane and the azeotroping agent is ethylene glycol.

7. The process according to claim 3 in which the sulfolane solvent is dimethyl sulfolane and the azeotroping agent is butylene glycol.

8. The process according to claim 3 in which the sulfolane solvent is dimethyl sulfolane and the azeotroping agent is propylene glycol.

9. A process for separating dimethyl sulfolane and hydrocarbons in a mixture thereof containing a major proportion of dimethyl sulfolane and hydrocarbons boiling within the range of from about 170° C. to about 260° C., a major proportion of the hydrocarbons being aromatic hydrocarbons, comprising the steps of distilling said mixture in a distillation zone in the presence of ethylene glycol to produce an overhead distillate consisting predominantly of hydrocarbons and ethylene glycol separated from a distillation residue consisting predominantly of dimethyl sulfolane, condensing the distillate, and separating the condensed distillate into a liquid hydrocarbon phase and a liquid ethylene glycol phase.

10. A process for separating dimethyl sulfolane and hydrocarbons in a mixture thereof containing about 90% of dimethyl sulfolane and about 10% of hydrocarbons boiling within the range of from about 170° C. to about 260° C., at least about 75% of said hydrocarbons being aromatic hydrocarbons, comprising the steps of distilling said mixture in a distillation zone in the presence of ethylene glycol to produce an overhead distillate consisting predominantly of hydrocarbons and ethylene glycol separated from a distillation residue consisting predominantly of dimethyl sulfolane substantially free from hydrocarbons, condensing the distillate, and separating the condensed distillate into a liquid hydrocarbon phase and a liquid ethylene glycol phase.

ARTHUR E. HANDLOS.
CINO J. PIEROTTI.

REFERENCES CITED

The following references are of record in the file of this patent:

UNITED STATES PATENTS

| Number | Name | Date |
|---|---|---|
| 2,357,344 | Morris et al. | Sept. 5, 1944 |
| 2,360,685 | Jensen | Oct. 17, 1944 |
| 2,368,597 | Morris et al. | Jan. 30, 1945 |
| 2,376,870 | Engel | May 29, 1945 |
| 2,381,996 | Bloomer | Aug. 14, 1945 |
| 2,427,989 | Wilson | Sept. 23, 1947 |
| 2,459,432 | Johnson | Jan. 18, 1949 |